US012328320B2

United States Patent
Field et al.

(10) Patent No.: US 12,328,320 B2
(45) Date of Patent: Jun. 10, 2025

(54) PROVISION OF DATA FROM A SERVICE PROVIDER NETWORK

(71) Applicant: Novatiq Technologies Limited, Cwmbran (GB)

(72) Inventors: Tanya Field, Cwmbran (GB); Dan Buliga, Cwmbran (GB); Simon Conway-Smith, Cwmbran (GB)

(73) Assignee: Novatiq Technologies Limited, Cwmbran (GB)

( * ) Notice: Subject to any disclaimer, the term of this patent is extended or adjusted under 35 U.S.C. 154(b) by 211 days.

(21) Appl. No.: 17/811,695

(22) Filed: Jul. 11, 2022

(65) Prior Publication Data

US 2022/0345466 A1 Oct. 27, 2022

Related U.S. Application Data

(63) Continuation of application No. PCT/GB2021/050080, filed on Jan. 14, 2021.

(30) Foreign Application Priority Data

Jan. 14, 2020 (GB) .................................... 2000545

(51) Int. Cl.
*H04L 9/40* (2022.01)
(52) U.S. Cl.
CPC ........ *H04L 63/123* (2013.01); *H04L 63/0853* (2013.01)
(58) Field of Classification Search
CPC ............................ H04L 63/123; H04L 63/0853
(Continued)

(56) References Cited

U.S. PATENT DOCUMENTS 8,442,858 B1 * 5/2013 Barnes ................... G06Q 30/02
705/14.55
8,832,436 B2 * 9/2014 Libonate ............... H04L 63/068
713/168

(Continued)

FOREIGN PATENT DOCUMENTS

CN 107251528 A 10/2017
CN 110611893 A 12/2019
(Continued)

OTHER PUBLICATIONS

International Search Report and Written Opinion dated Jun. 17, 2021 for PCT Application No. PCT/GB2021/050080.
(Continued)

*Primary Examiner* — Thanh T Le
(74) *Attorney, Agent, or Firm* — EIP US LLP

(57) ABSTRACT

A method for providing subscriber data from a first service provider network to a content provider external to the service provider network comprises receiving a first network identifier sent from a subscriber device that is authenticated to communicate over the first service provider network, wherein the first network identifier is sent by the subscriber device in a first message to an entity outside of the service provider network; receiving a second network identifier sent from the subscriber device to the first service provider network; performing a verification process using the first network identifier and the second network identifier to verify whether it is permissible for subscriber data stored at the service provider network to be provided to the content provider external to the service provider network. In response to the verification process being successful, the subscriber data is provided to an entity that is external to the service provider network.

21 Claims, 6 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 8,856,908 | B2* | 10/2014 | Michel | H04N 7/17318 |
| | | | | 726/9 |
| 10,341,243 | B2 | 7/2019 | Short et al. | |
| 2002/0026351 | A1 | 2/2002 | Coleman | |
| 2003/0233329 | A1* | 12/2003 | Laraki | H04L 67/04 |
| | | | | 705/52 |
| 2010/0024022 | A1 | 1/2010 | Wells et al. | |
| 2010/0094758 | A1* | 4/2010 | Chamberlain | G06Q 10/06375 |
| | | | | 705/50 |
| 2011/0119131 | A1 | 5/2011 | Levi et al. | |
| 2011/0238474 | A1 | 9/2011 | Carr et al. | |
| 2013/0254036 | A1 | 9/2013 | Trinh et al. | |
| 2013/0318346 | A1* | 11/2013 | Libonate | H04L 43/16 |
| | | | | 713/168 |
| 2014/0289839 | A1* | 9/2014 | Chen | H04L 63/0807 |
| | | | | 726/9 |
| 2014/0364151 | A1 | 12/2014 | Schiff et al. | |
| 2015/0019952 | A1* | 1/2015 | Grant | G06F 16/9535 |
| | | | | 715/234 |
| 2015/0242602 | A1* | 8/2015 | Skygebjerg | H04W 12/06 |
| | | | | 726/7 |
| 2015/0271205 | A1* | 9/2015 | Duminuco | H04L 63/168 |
| | | | | 713/151 |
| 2015/0312236 | A1 | 10/2015 | Ducker et al. | |
| 2016/0080372 | A1 | 3/2016 | Martin et al. | |
| 2018/0063076 | A1* | 3/2018 | Field | H04L 63/08 |

FOREIGN PATENT DOCUMENTS

| | | |
|---|---|---|
| EP | 3248364 A1 | 11/2017 |
| WO | 2018160358 A1 | 9/2018 |

OTHER PUBLICATIONS

Combined Search and Examination Report dated Jun. 30, 2020 for Application No. GB2000545.0.
Korean Notice of Allowance dated May 30, 2024 for Korean Patent Application No. 10-2022-7027898.
Invitation to Respond to Written Opinion dated Jan. 23, 2025 for Singapore Application No. 11202251124E.
Chinese Office Action dated Jan. 24, 2025 for Chinese Patent Application No. 2021800180708.

* cited by examiner

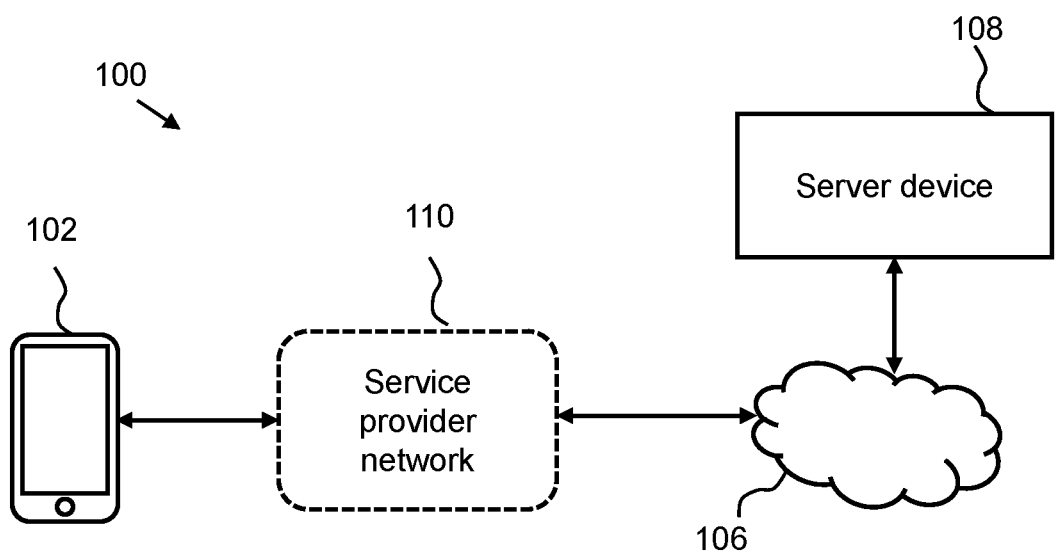
**FIG. 1A – *Prior Art***
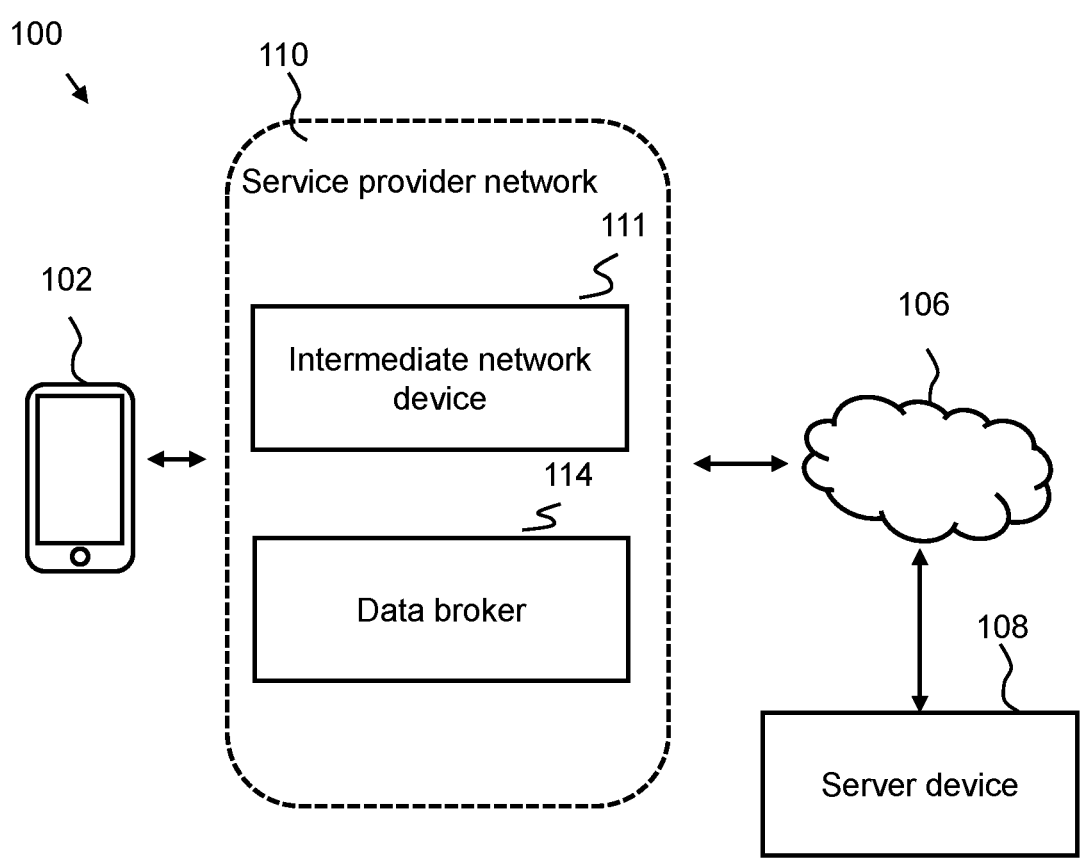
**FIG. 1B – *Prior Art***

PROVISION OF DATA FROM A SERVICE PROVIDER NETWORK

CROSS-REFERENCE TO RELATED APPLICATIONS

This application is a continuation of International Application No. PCT/GB2021/050080, filed Jan. 14, 2021, which claims priority to GB Application No. 2000545.0, filed Jan. 14, 2020, under 35 U.S.C. § 119(a). Each of the above-referenced patent applications is incorporated by reference in its entirety.

BACKGROUND

Technical Field

The present invention relates to network communications. In particular, but not exclusively, the present invention relates to processing network requests in a telecommunications network to enable data provision.

Background

Users who wish to access data stored at a remote location and/or remote computer-implemented services typically do so via a telecommunications network, such as the Internet. In order to transmit and receive data via a telecommunications network, users conventionally subscribe to a telecommunications service provided by a telecommunications service provider. A telecommunications service typically provides access to a wider telecommunications network for a given subscriber device, a group of subscriber devices, or a residential or commercial premises network associated with a given subscriber. The service provider network typically performs subscriber authentication and comprises a routing fabric for routing traffic between an authenticated subscriber and the wider telecommunications network. A service provider may comprise a carrier, a mobile network operator (MNO), a wireless network operator or an internet service provider (ISP). Subscriber devices may include personal computers, laptop computers, mobile telephones (including "smart phones"), tablet computers, personal digital assistants, Smart TVs, etc.

FIG. 1 shows a simplified example of a telecommunications network 100. A subscriber device 102 may initially access a service provider network 110 of the telecommunications network 100, which contains various entities provisioned by the service provider. A service provider network 110 for a carrier or a mobile network operator may comprise at least one of: a Global System for Mobile Communications (GSM) network and a Universal Mobile Telecommunications System (UMTS) network, e.g. implementing one of the Long-Term Evolution (LTE) standards. In certain cases, the service provider network 110 may comprise a radio access network and a core network, e.g. as coupled by one or more service edge components. The radio access network may comprise one or more base stations (such as node base-stations—NBs—or enhanced node base-stations—eNBs). User equipment (such as mobile telephones, so-called smart-phones, laptops and tablets, amongst others) may attach to the core network via the radio access network. The core network may comprise a serving gateway, a packet data network gateway and a gateway general packet radio service (GPRS) support node. User equipment may connect to other public packet switched networks, e.g. the Internet, via the core network of the service provider. Service provider entities may be responsible for authentication of subscribers/subscriber devices, access management, billing, etc. This may be performed in association with a home subscriber server or user profile server function (or an authentication centre for GSM) within the service provider network 110. In this manner, the service provider network 110 typically acts as a gateway between subscriber device 102 and a wider network 106, such as the public internet. The wider network 106 is, at least in part, used to route data between service provider network 110 and one or more server devices 108.

Telecommunications network 100 may also comprise a number of further network parts (not shown), and a number of border/gateway/caching entities (not shown) used to translate between the various network protocols used in each network part where necessary, cache and serve commonly-accessed data so as to reduce load between network parts, and/or manage access to each network part.

Access to data and/or computer-implemented services via telecommunications network 100 is typically enabled using browser software or other applications (hereinafter "a browser") on subscriber device 102. Other applications on subscriber device 102 may include games or software utilities that also require access to content via telecommunications network 100. For example, some applications accrue revenue by displaying content to their users. Such content is typically regularly updated and hosted at a server device in telecommunications network 100. The application may therefore require access to the server device via telecommunications network 100 in order to obtain up-to-date content to display to its users.

A browser enables subscriber device 102 to take part in a browser session, which comprises a series of one or more requests and responses made to and received from one or more remote entities, such as server device 108, via telecommunications network 100. A browser may be used to view web pages, obtain files, conduct services such as instant messaging, etc. via telecommunications network 100. Browser session requests and responses typically comprise one or more data packets. Such packetized data is formatted and transported according to one or more network protocols, used in a given part of the network.

Some browser sessions may contain a series of multiple browser session requests and browser session responses. This will be the case, for example, if the subscriber browses to multiple web pages consecutively in the given browser session. Often, a series of multiple requests and responses will be required to view a single web page. This is particularly true if different elements of the web page are hosted at different server entities and/or if the web page or service is implemented dynamically, e.g. if HyperText Markup Language (HTML) data is generated in real-time by server device 108 following receipt of a request using one or more server functions. A common example is encountered when a web page includes one or more advertisement elements.

In a previous example network shown in FIG. 1B, the service provider network 110 comprises a first entity, intermediate network device 111, which is introduced into service provider network 110 between subscriber device 102 and wider network part 106. Intermediate network device 111 may be physically located in service provider network 110, or logically located in service provider network 110 through the use of, for example, a virtual or backhaul private network, but physically located/hosted elsewhere. Service provider network 110 may be adapted to route browser session traffic between subscriber device 102 and wider network part 106 via intermediate network device 111.

In a network such as that shown in FIG. 1B, network requests sent from the subscriber device into the service provider network 110 are accessible by the service provider network 110, i.e. by the intermediate network device 111. For example, a network request sent from the subscriber device 102 may comprise an HTTP request, and this request may be directed to the service provider network 110 or may be directed elsewhere in network 100 but routed via the service provider network 110. Since the service provider network 110 is able to read such network requests, in such examples, the intermediate network device 111, may modify a browser session request or a browser session response it receives. This modification of a network request may, for example, comprise adding a network identifier into a network request before sending the modified request to the server device 108 or another entity external to the service provider network 110.

In an example, a network identifier added into a modified browser request by intermediate network device 111 is sent to the server device 108, whereby the server device 108 obtains the network identifier. The network identifier acts to authenticate subsequent communications between the server device 108 and the service provider network 110. For example, the server device 108 may send a subsequent network request including the network identifier to the service provider network 110 and the service provider network 110 may be configured to verify the returned network identifier. The service provider network 110 may be configured to perform an action conditional on the verification. In the example of FIG. 1B, the service provider network further comprises a second entity, data broker 114, which is configured to receive and process requests from the server device 108. The data broker 114 receives the network identifier sent to the server device 108 and may perform a verification process and perform an action, such as providing subscriber data to the server device 108, if the network identifier is successfully verified.

The examples above give an outline of methods and systems for processing browser sessions in a telecommunications network. However, it is an object of the present invention to provide improved methods and systems for communicating over a telecommunications network.

SUMMARY

According to a first aspect of the present invention there is provided a method for providing subscriber data from a first service provider network to a content provider external to the service provider network, the method comprising: receiving a first network identifier sent from a subscriber device that is authenticated to communicate over the first service provider network, wherein the first network identifier is sent by the subscriber device in a first message to an entity outside of the service provider network; receiving a second network identifier sent from the subscriber device to the first service provider network; performing a verification process using the first network identifier and the second network identifier to verify whether it is permissible for subscriber data stored at the service provider network to be provided to the content provider external to the service provider network; and providing, in response to the verification process being successful, the subscriber data to an entity that is external to the service provider network.

According to a second aspect of the present invention there is provided a method for receiving content at a subscriber device that is authenticable to communicate over a first service provider network, the method comprising, at the subscriber device: generating a first network identifier and a second network identifier; sending a first message comprising the first network identifier to an entity outside of the service provider network; sending the second network identifier to the first service provider network; receiving, at the subscriber device, a network response from the entity outside of the service provider network, wherein the network response includes content included in the network response in dependence upon subscriber data from the service provider network having been provided to a content provider external to the first service provider network in response to the first network identifier and the second network identifier having been used in a process that verifies that it is permissible for the subscriber data to be provided to the content provider.

According to a third aspect of the present invention there is provided a non-transitory computer readable medium comprising a set of computer-readable instructions which when executed by an apparatus cause the apparatus to perform a method for providing subscriber data from a first service provider network to a content provider external to the service provider network, the method comprising: receiving a first network identifier sent from a subscriber device that is authenticated to communicate over the first service provider network, wherein the first network identifier is sent by the subscriber device in a first message to an entity outside of the service provider network; receiving a second network identifier sent from the subscriber device to the first service provider network; performing a verification process using the first network identifier and the second network identifier to verify whether it is permissible for subscriber data stored at the service provider network to be provided to the content provider external to the service provider network; and providing, in response to the verification process being successful, the subscriber data to an entity that is external to the service provider network.

According to a fourth aspect of the present invention there is provided a non-transitory computer readable medium comprising a set of computer-readable instructions which when executed by a subscriber device cause the device to perform a method for receiving content at the subscriber device, the subscriber device being authenticable to communicate over a first service provider network, the method comprising, at the subscriber device: generating a first network identifier and a second network identifier; sending a first message comprising the first network identifier to an entity outside of the service provider network; sending the second network identifier to the first service provider network; receiving, at the subscriber device, a network response from the entity outside of the service provider network, wherein the network response includes content included in the network response in dependence upon subscriber data from the service provider network having been provided to a content provider external to the first service provider network in response to the first network identifier and the second network identifier having been used in a process that verifies that it is permissible for the subscriber data to be provided to the content provider.

According to a first further aspect of the present disclosure there is provided a set of machine-readable instructions which when executed by an apparatus cause the apparatus to perform a method for providing subscriber data from a first service provider network to a content provider external to the service provider network, the method comprising: receiving a first network identifier sent from a subscriber device that is authenticated to communicate over the first service provider network, wherein the first network identifier is sent by the subscriber device in a first message to an entity outside of the service provider network; receiving a second network identifier sent from the subscriber device to the first service provider network; performing a verification process using the first network identifier and the second network identifier to verify whether it is permissible for subscriber data stored at the service provider network to be provided to the content provider external to the service provider network; and providing, in response to the verification process being successful, the subscriber data to an entity that is external to the service provider network.

According to a second further aspect of the present disclosure there is provided a set of machine-readable instructions which when executed by a subscriber device cause the device to perform a method for receiving content at the subscriber device, the subscriber device being authenticable to communicate over a first service provider network, the method comprising, at the subscriber device: generating a first network identifier and a second network identifier; sending a first message comprising the first network identifier to an entity outside of the service provider network; sending the second network identifier to the first service provider network; receiving, at the subscriber device, a network response from the entity outside of the service provider network, wherein the network response includes content included in the network response in dependence upon subscriber data from the service provider network having been provided to a content provider external to the first service provider network in response to the first network identifier and the second network identifier having been used in a process that verifies that it is permissible for the subscriber data to be provided to the content provider.

According to a third further aspect of the present disclosure there is provided an apparatus configured to perform a method for providing subscriber data from a first service provider network to a content provider external to the service provider network, the method comprising: receiving a first network identifier sent from a subscriber device that is authenticated to communicate over the first service provider network, wherein the first network identifier is sent by the subscriber device in a first message to an entity outside of the service provider network; receiving a second network identifier sent from the subscriber device to the first service provider network; performing a verification process using the first network identifier and the second network identifier to verify whether it is permissible for subscriber data stored at the service provider network to be provided to the content provider external to the service provider network; and providing, in response to the verification process being successful, the subscriber data to an entity that is external to the service provider network.

According to a fourth further aspect of the present disclosure there is provided a subscriber device comprising a set of machine-readable instructions which cause the device to perform a method for receiving content at the subscriber device, the subscriber device being authenticable to communicate over a first service provider network, the method comprising, at the subscriber device: generating a first network identifier and a second network identifier; sending a first message comprising the first network identifier to an entity outside of the service provider network; sending the second network identifier to the first service provider network; receiving, at the subscriber device, a network response from the entity outside of the service provider network, wherein the network response includes content included in the network response in dependence upon subscriber data from the service provider network having been provided to a content provider external to the first service provider network in response to the first network identifier and the second network identifier having been used in a process that verifies that it is permissible for the subscriber data to be provided to the content provider.

Optionally, the first service provider network comprises one or more of: a carrier network; a mobile network; a cellular network; and an internet service provider network.

Further examples and variations of the above aspects of the present invention are set out in the dependent claims.

Further features and advantages of the invention will become apparent from the following description of preferred examples of the invention, given by way of example only, which is made with reference to the accompanying drawings.

BRIEF DESCRIPTION OF THE DRAWINGS

FIGS. 1A and 1B are schematic system diagrams showing a telecommunications system according to the prior art;

DETAILED DESCRIPTION

Certain examples described herein allow for subscriber data stored at a service provider network to be provided to an entity outside of the service provider network. In certain examples, the subscriber data may be provided to the entity outside of the service provider network without providing the device with an identity of the subscriber. The entity outside of the service provider network may be, for example, a content provider, such as a server device performing functions of an advertising platform. The entity may for example provide a response to a request from the subscriber device or a request based on such a request from the subscriber device. In certain examples, methods described herein allow the service provider network to provide subscriber data to a content provider even when a network request is sent from the subscriber device to an entity external to the service provider network, such as the content provider, without the network request being accessible, e.g. readable, by the service provider network. For example, a network request may be received at the entity external to the service provider network from the subscriber device via a secure communications channel, e.g. via an HTTPS message.

Certain examples described herein use a network identifier that is inserted by a subscriber device into network requests sent by the subscriber device. The network identifier may comprise a random string, e.g. alphanumeric characters that do not in themselves comprise data retrieved from within the service provider network.

Figure 2:
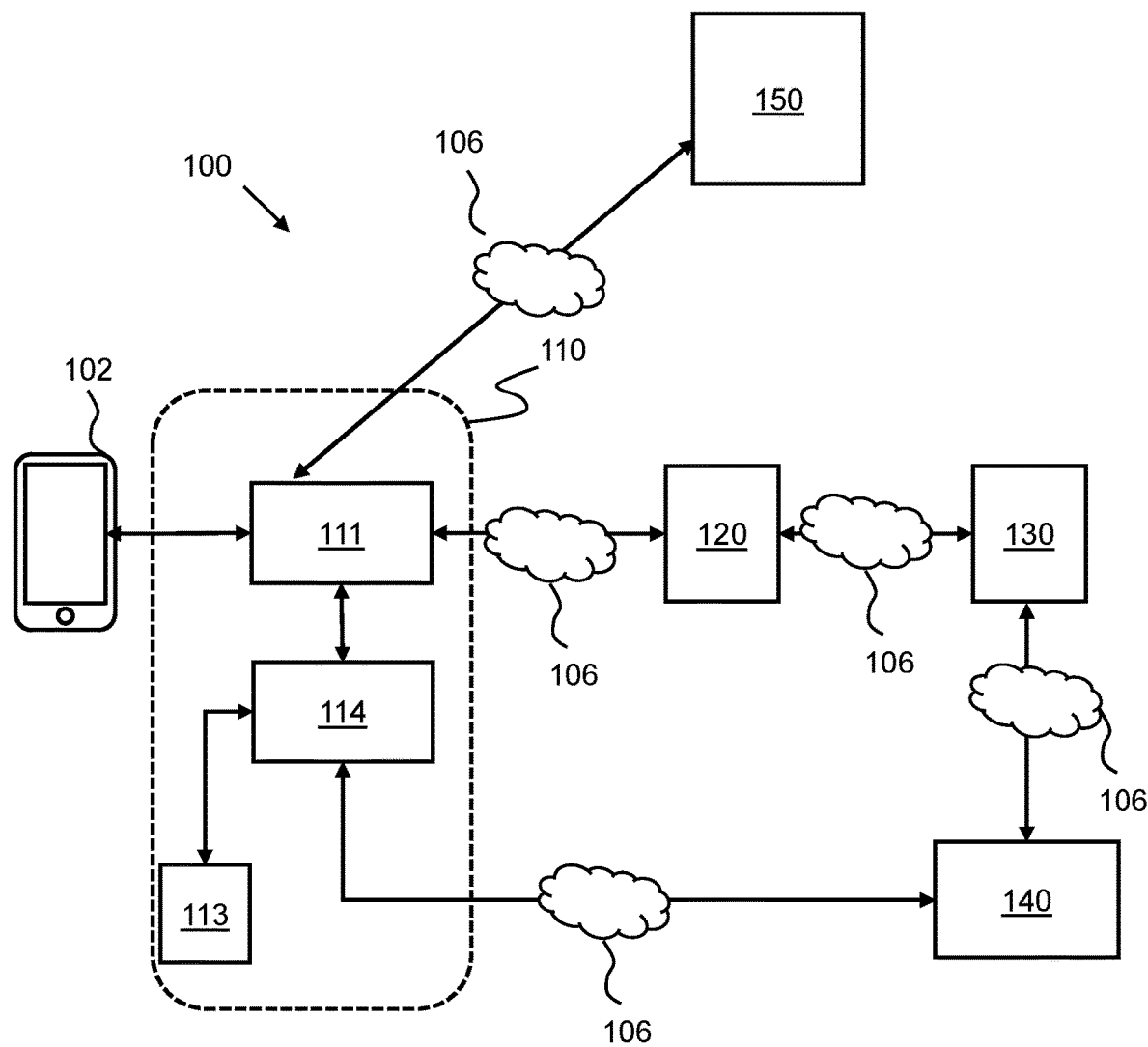
FIG. 2 is a schematic system diagram showing components of a telecommunications system according to examples.

FIG. 2 shows a telecommunications network 100 according to examples of the present disclosure. Telecommunications network 100 comprises at least service provider network 110 and wider network part 106. Telecommunications network 100 may additionally comprise further network parts (not shown), and or border/gateway/caching entities (not shown) for translating between the various network protocols used in each network part, caching and serving commonly accessed data so as to reduce load between network parts and/or managing access to each network part. The telecommunications network 100 may comprise features as described with reference to FIGS. 1A and 1B. Service provider network 110 is responsible for providing telecommunications services to a plurality of subscriber devices, including at least subscriber device 102. A subscriber device may be configured to communicate voice and data. Examples of subscriber devices may include personal computers, laptop computers, mobile telephones (including "smart phones"), tablet computers, personal digital assistants, Smart TVs, etc.

The telecommunications network 100 comprises a content server 150 which is external to the service provider network 110. Content server 150 is in communication with the subscriber device 102, and the content server 150 and subscriber device 102 exchange network requests and responses such that content is provided to the subscriber device 102. In this example, network requests and responses between the subscriber device 102 and the content server 150 are communicated via the service provider network 110 and wider network 106, which may be, for example, the Internet. The subscriber device 102 may exchange browser session traffic with the content server 150, for example to receive webpage content from the content server 150. In certain cases, network requests may not be browser based, e.g. may relate to, amongst others: voice and/or data requests that are processed by the service provider network; location requests to a positioning system; and/or network requests transmitted by one or more applications or operating systems on the subscriber device 102. A network request, in one implementation, may comprise an HTTPS request sent between two entities in the network 100. A browser session may, as such, comprise an HTTPS session. The HTTPS request may comprise a GET or POST method call. In other implementations, the network request may comprise packets of data sent by another application layer protocol or by another protocol in a network communication stack.

Service provider network 110 includes intermediate network device 111 and data broker 114. In examples, the intermediate network device 111 receives network requests from subscriber device 102, i.e. a subscriber device operated by a subscriber, wherein the subscriber and/or the subscriber device are authenticated and are authorised to use the service provider network 110.

Telecommunications network 100 comprises further entities external to the service provider network, in addition to content server 150. The network 100 comprises first entity 120, second entity 130 and a further entity 140 which in examples herein will be referred to as server 140.

In one example, the intermediate network device 111 may comprise an additional server, or adapted functionality of an existing server, coupled to or within a core network, wherein packet-based network traffic is routed through the intermediate network device 111. In one case, intermediate network device 111 may comprise a plurality of servers in parallel, where a load balancing entity may be configured to receive network requests from client subscriber devices and distribute these network requests amongst the plurality of servers. In one example intermediate network device 11 may comprise a multi-core server blade comprising at least one processor and at least one memory.

Intermediate network device 111 is configured to process or route network requests, such as browser session traffic, as described above for the content server 150. In certain cases, a network request may relate to a portion of a requested web-page, e.g. may be a request for content (e.g. advertising data/content) from an entity that differs from an entity that is supplying the webpage. That is, in this example, the intermediate network device 111 may route to the first entity 120 network requests from the subscriber device 102 requesting content from the first entity 120. The content requested by the device 102 from the first entity 120 may be related to content received from the content server 150. For example, the network requests sent to the first entity 120 may comprise a request for a portion of a webpage provided by the content server 150. In one example, the first entity 120 is an advertising entity and a network request sent from the subscriber device 102 comprises a request for an advertisement to be displayed along with content provided by content server 150.

In examples, the subscriber device 102 and first entity 120 communicate via a secure communications channel such that the intermediate network device 111 may route messages between the device 102 and the first entity 120 but is unable to read the messages. For example, the subscriber device 102 and first entity 120 may communicate by exchanging messages using a suitable secure Layer 7 communication protocol, for example, HTTPS. Routing via intermediate network device 111 as described herein may be implemented using policy-based routing based on an IP address of a network request. The policy-based routing may be applied to a pre-defined network traffic type (e.g. HTTPS only) and be configured to route data via an IP address of the intermediate network device 111 and/or a load balancer associated with a plurality of intermediate network devices. The intermediate network device 111 may operate as a transparent proxy within network communications. The intermediate network device 111 may be configured using a management network within the service provider network 104.

Data broker 114 may comprise a server, i.e. a computing device configured to process computer program code implementing a server functionality, which is adapted to access subscriber data stored at a data storage 113 accessible to the service provider network 110. In some examples, the data storage 113 is located within the service provider network 110, in other examples, the data storage 113 is located outside of the service provider network 110 but is accessible only by the service provider network 110, for example via a secure communication between the data broker 114 and the data storage 113. In examples, the data broker 114 is securely coupled to the service provider network 110, e.g. via a virtual or backhaul private network, and is also accessible from outside the service provider network 110, e.g. is connected to the Internet and/or has a public IP address or uniform resource locator. The data broker 114 is communicatively coupled to server 140 outside of the service provider network 110. In examples, the data broker 114 and the server 140 are communicatively coupled via the wider network 106. The server 140 may be a cloud-based server. The data broker 114 may have a trusted relationship with the server 140, and may, for example, communicate via a secure communications channel with the server 140. Similarly to intermediate network device 111, data broker 114 may be implemented on one or more server devices, e.g. such as a multi-core server blade comprising at least one processor and at least one memory. Such server devices may implement one or more operating systems, e.g. a Linux-based operating system, one or more web servers, and one or more data storage management systems.

According to examples, service provider network 110 comprises a carrier network operated by a carrier. A carrier network may provide wired and/or wireless network access. According to examples, service provider network 110 comprises a mobile network (which may be in the form of a cellular network) operated by a mobile network operator (MNO). A mobile network operator provides wireless network access, e.g. by way of a radio access network and a core network as described previously. According to examples, service provider network 110 comprises an internet service provider network operated by an internet service provider (ISP). An ISP may provide wired network access, e.g. via dial-up, (asymmetric) digital subscriber lines, cable modems, integrated services digital networks and/or fibre-optic lines. A carrier network may comprise a mobile network and/or an ISP. In certain cases, the server provider network 110 may alternatively or additionally provide telecommunications services in the form of wireless network (e.g. "wi-fi") access to at least one subscriber device 102; this may be instead of, or in addition to, mobile access (e.g. by an MNO) and/or ISP functions. Wider network part 106 is responsible for routing traffic (e.g. packetized data traffic encoded according to the Hypertext Transfer Protocol (HTTP) or a secure extension of HTTP, such as HTTPS) to and from one or more entities accessible via wider network part 106, such as first entity 120 and second entity 130. The wider network part may also route traffic to a server 140, the functionality of which will be discussed in more detail below. Where the service provider network 110 is an MNO, the data broker 114 may be a Telephony Applications Server (TAS).

Figure 3:
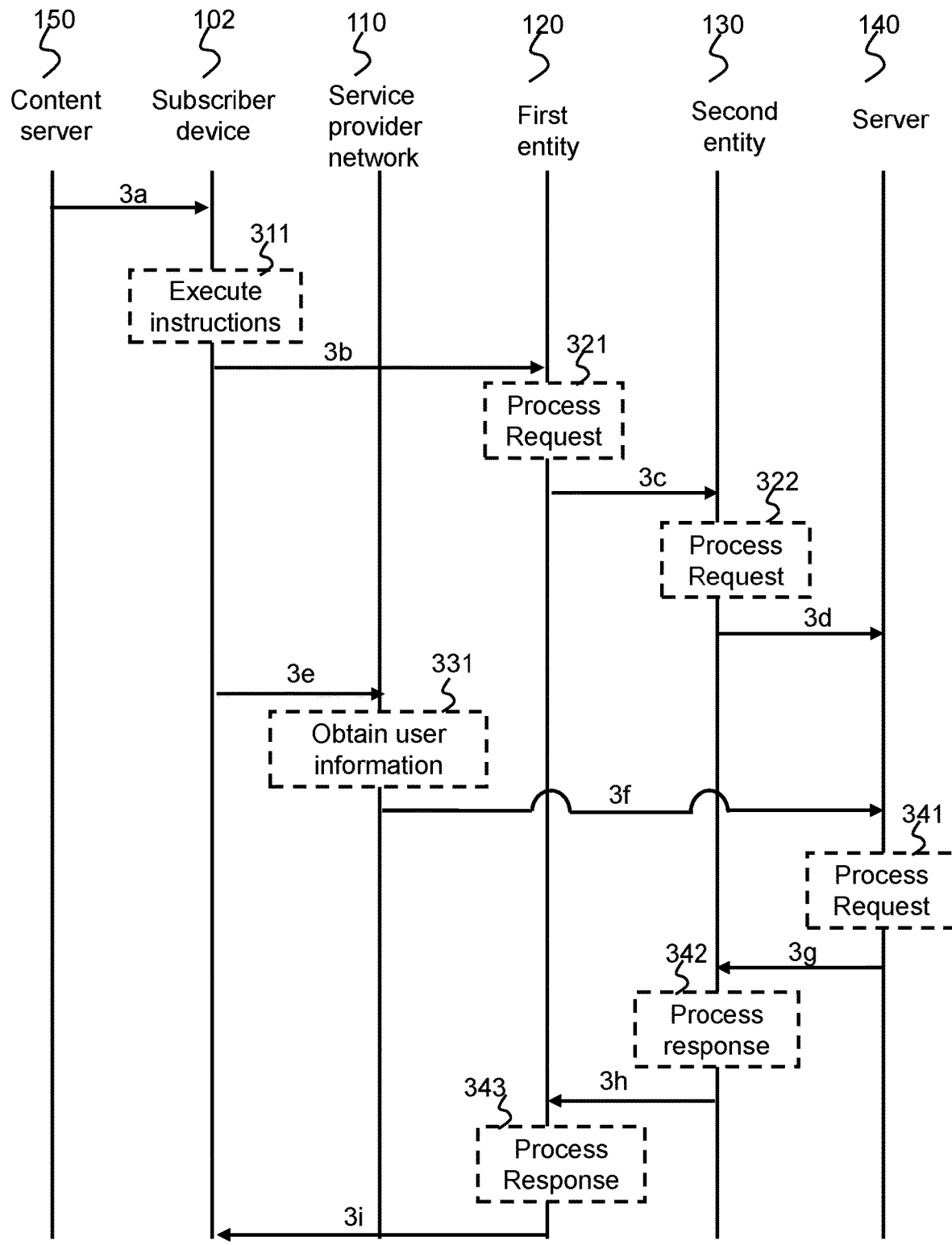
FIG. 3 is a flow diagram showing a method of operation of a network according to examples.

FIG. 3 illustrates an example method of operation of the network 100 in the context of a usage session taking place at the subscriber device 102. The subscriber device 102 in FIG. 3 is in a usage session in which browser requests are sent to and from content server 150, such as in examples described above with reference to FIG. 2. At action 3a, the subscriber device 102 receives a network response from content server 150. For example, the network response may be a webpage received as an HTTP or HTTPS message from the content server 150. For reasons of clarity, in FIG. 3 the content server 150 is shown to the left of the subscriber device 102, however in this example, messages between the content server 150 and the subscriber device 102 are sent through the service provider network 110, as described for FIG. 2.

The network response received by the device 102 from the content server 150 at action 3a comprises a set of machine readable instructions for execution by the subscriber device, in this example in addition to the content such as webpage content. The machine readable instructions may in one example comprise a portion of JavaScript included with the network response, e.g. HTTP or HTTPS response, which causes a method described herein to be performed by the subscriber device 102 when executed by a processor (not shown) of subscriber device 102. In this example, the subscriber device at action 3a receives the machine readable instructions from the content server 150 via the service provider network 110.

At block 311, upon execution of the instructions by subscriber device 102, the subscriber device 102 is caused to generate a first network request to send to an entity external to the service provider network, in this example first entity 120. The first network request may be a browser request for a portion of webpage, for example a request for an advertisement to be rendered in a webpage received from the content server 150. In this example, the subscriber device 102 is configured to communicate via a secure communication channel with the first entity 120, e.g. via HTTPS messages. Since the first network request is sent via a secure communications channel between the subscriber device 102 and the first entity 120, the service provider network 110 is unable to read the first network request, despite the first network request being routed via the service provider network 110. As such, the service provider network 110 is unable to modify the first network request.

The set of instructions executed at block 311 allow for a network response to be provided to the client device 102 which is dependent on subscriber data stored at the service provider network 110, without the service provider network modifying the first network request. That is, in addition to causing the generation of a first network request, the set of instructions when executed at block 311 cause the subscriber device 102 to generate first and second network identifiers. On executing the instructions, the first network identifier is included in the first network request which is sent from the subscriber device 102 to the first entity 120, at action 3b. Also on executing the instructions, the second network identifier is included in a second network request which is sent to the service provider network at action 3e, and which is readable by the service provider network 110 such that the second network identifier is accessible to the service provider network 110. The first network identifier and second network identifier are configured such that they may be used in performing a verification process to verify whether it is permissible for subscriber data associated with the subscriber device and stored at the service provider network to be provided to an entity in the network 100, external to service provider network 110, for example to a content provider such as second entity 130.

In examples, the first network identifier and the second network identifier are created as identical copies of one another. In other examples, the first network identifier and second network identifier may be different from one another but configured to be compared or verified against one another.

A network identifier comprises any data, for example in the form of a token, that is used to link a network request to the subscriber device 102, or to a particular request sent therefrom. In one case, a network identifier may comprise a series of characters, e.g. from a character encoding scheme such as the American Standard Code for Information Interchange (ASCII). A network identifier may be of a predefined length, e.g. a defined number of characters. The predefined length may be configurable; for example, it may be defined based on an estimated network request load. If the network request comprises an HTTPS request, then the network identifier may be inserted by the network request by the subscriber device into a Uniform Resource Locator (URL), e.g. as a parameter value within a query string—"/server-device/resource.html?nid=d5VWn9LKoz". Alternatively and/or additionally, the network identifier may be added to an HTTPS request as request header field, e.g. as a value for a standard or non-standard request field, such as "X-NID: d5VWn9LKoz". In one case, the network identifier may be inserted into a user agent field, e.g. a modifiable user agent field in an HTTPS request. In other examples, the network identifier may be sent by any suitable means which allows linking of the network identifier to the associated network request. In examples a network identifier sent from the subscriber device 102 does not comprise subscriber data, e.g. is not an encrypted version or hash of that data. This means that it cannot be used to track a subscriber. A hash or encrypted version of data would have a set value for a set data item, e.g. an age of "18" would have the same encrypted or hashed value and so could be decoded.

In examples, the first and/or second network identifier comprise a universally unique identifier (UUID). In some embodiments, each network identifier is generated based on high-quality randomness, for example using Linux/Unix's/dev/urandom data generation. In some embodiments, each network identifier is generated on the basis of one or more of the current time, a local ethernet media access control (MAC) address and data generated using a pseudo-random generator.

In some examples, when using high-quality randomization there is no seed (such as time and MAC address) that can be isolated. A sample of a log containing an example network identifier is as follows:

[Thu Aug 20 19:27:20.338477 2015] [hee:trace2] [pid 2445:tid 140063197697792] mod_hee.c(3918): AH03067: sp_id=dbbd46fb-aabe-4be4-bad0-0ce6a428fbb0;

The components in the above sample log can be explained as follows:
[Thu Aug 20 19:27:20.338477 2015]=log entry time;
[hee:trace2]=log verbosity level, this part mentions the source of the entry (in this case from the engine itself (HEE));
[pid 2445:tid 140063197697792]=process id (pid) and thread id (tid);
mod_hee.c(3918):=source file and line number where the log entry has been triggered from;
AH03067=the error (debug) code;
sp_id=dbbd46fb-aabe-4be4-bad0-0ce6a428fbb0=the actual network identifier associated to the key named "sp_id".

Returning to FIG. 3, at action 3b, the subscriber device 102 sends the first network request including the first network identifier to the first entity 120. The first network request including first network identifier is sent via the service provider network 110 but is in examples in-accessible by the service provider network 110. For example, the request may be sent via a secure communications channel between the device 102 and the first entity 120 as described above. The first network request in an example is a request for an advertisement, for example as part of a webpage being accessed in a browser session of the subscriber device 102. In this example, responsive to receiving the first network request, the first entity 120 is configured to extract the first network identifier. That is, in examples, the first entity 120 receives the first network request with first network identifier as an HTTPS message which it is configured to decrypt and decrypts the message and parses the first network request for the first network identifier. In an example wherein the first network request received from the subscriber device 102 is a request for an advertisement, first entity 120 is an advertising platform server, with first entity 120 being a supply-side platform (SSP). The first entity 120 generates a network request at block 321 to be sent to second entity 130, requesting that the second entity 130 provide content to the first entity 120 for responding to the first network request from subscriber device 102. In an example, the second entity 130 is a demand-side platform (DSP). In this example, the SSP 120 upon receiving the request for an advertisement generates a bid request for sending to the DSP 130 to fulfil the original advertisement request from the device 102. In some examples the SSP may send the request to plurality of DSPs and may determine which of a plurality of DSPs to send an advertisement request to, for example depending on the content of the advertisement request received from the subscriber device 102. The first network identifier is included in the network request generated at block 321.

At action 3c, the first entity 120 sends the network request including first network identifier generated at block 321 to the second entity 130. In this example, the network request sent from the SSP 120 to the second DSP 130 may be a real-time bidding (RTB) request. For example, details of the webpage to which the advertisement request relates, and details of the advertisement, such as position or size in the webpage may be provided to the second entity 130.

The second entity 130 is configured to provide a response to the request received from the first entity 120, and in examples acts as a content provider for providing content to be sent to the subscriber device 102. In examples, the second entity 130 may process a network request received from the first entity 120, to determine an action to take. For example, if the received network request is a bid request, the second entity at block 322 may determine whether to submit a network request to the server 140 to seek subscriber data to inform a bid made in response to the bid request. At block 322, the second entity 130 may determine to obtain details of the subscriber device 102, and or data relating to a subscriber or user relating to the advertisement request. For example, subscriber data may allow the second entity 130 to more accurately determine a price which it is willing to pay for fulfilling the advertisement request. However, for reasons at least that the first network request has been transmitted by the subscriber device 102 via a secure connection to the first entity 120 without being accessible by the service provider network 110, neither the first entity 120 nor the second entity 130 is provided with data originating in the service provider network 110 via the first network request. As such, to obtain such data, the second entity 130 makes a request at action 3d for subscriber data relating to the received network request from the server 140. The request for data may be a request for a portion of the subscriber data accessible by the service provider network 110. For example, the second entity 130 may request age and nationality details of the subscriber. The second entity 130 includes the first network identifier with the request for subscriber data.

Returning to the operation of subscriber device 102 upon executing the machine readable instructions, at action 3e, the subscriber device 102 sends the second network request comprising second network identifier to the service provider network 110. At block 331, the service provider network 110 processes the received network request. The second network request in some examples is a synchronisation request which requests the synchronisation of processing of network requests by the service provider network 110.

Figure 4:
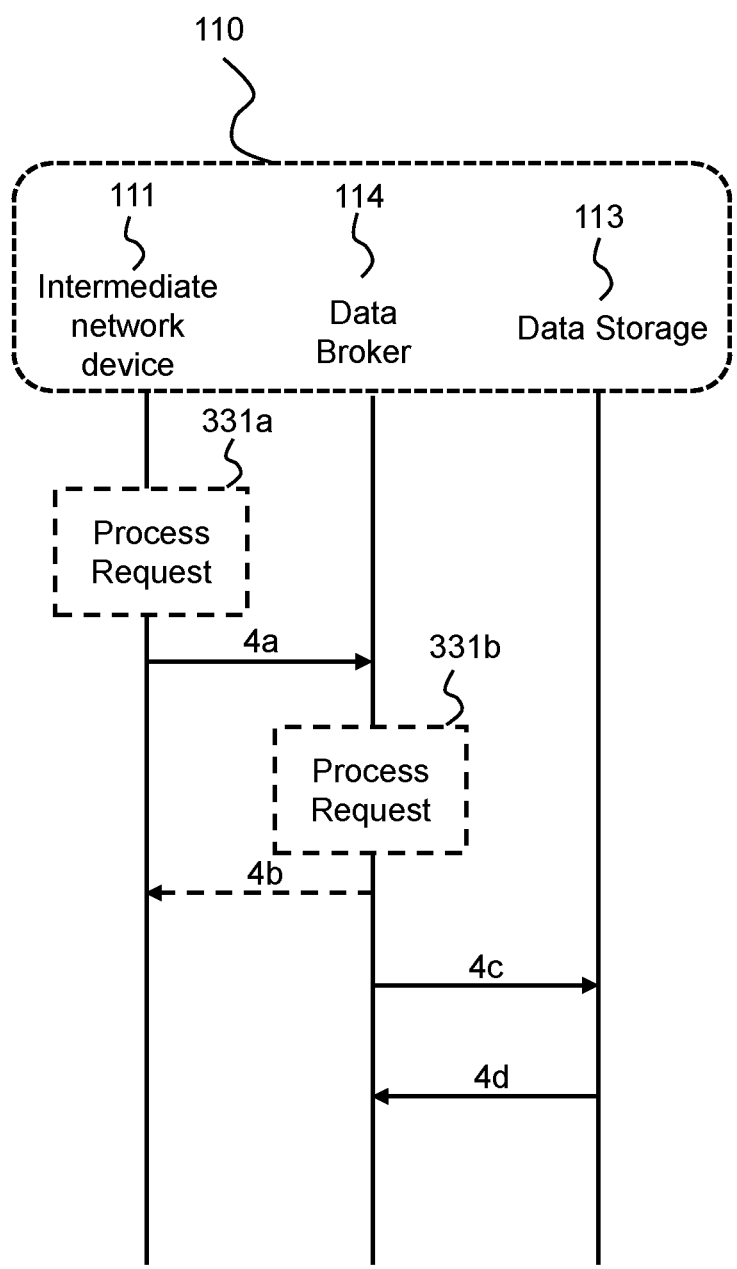
FIG. 4 is a flow diagram showing further details of the example method of operation of a network according to the example of FIG. 4.

Now with reference to FIG. 4, at block 331a intermediate network device 111 processes the received second network request and second network identifier. The second network request comprising the second network identifier is received at intermediate network device 111 via a secure communications channel between the subscriber device 102 and the intermediate network device 111. The intermediate network device 111 may possess means for decrypting the second network request and second network identifier and does this decryption at block 331a. In an example, the intermediate network device 111 possesses security certificates to read the second network request which is received via an HTTPS communication from the subscriber device 102. In this example, at block 331a, the intermediate network device 111 obtains a subscriber identifier relating to the subscriber device 102, for example by using network data that is accessible within the service provider network 110. For example, one or more of an international mobile subscriber identity and an international mobile equipment identity may be used as a subscriber identifier to determine a subscriber identity.

At action 4a, the intermediate network device 111 transmits the second network request comprising the second network identifier to the data broker 114, having performed decryption of the message received from the subscriber device at block 331a. The intermediate network device 111 additionally transmits the subscriber identifier, obtained at block 331a to the data broker 114. Action 4a may in some examples comprise sending a message comprising the second network identifier and second network request, and the subscriber identifier to the data broker 114. For example, such a message may be an Internet Content Application Protocol (ICAP) request. In other examples, the message may be a HTTP message, or in further examples the message may be a User Datagram Protocol (UDP) request. In some examples, the method comprises action 4b, at which the data broker 114 sends a response to the message received at action 4a. For example, where action 4a comprises sending of an ICAP request, action 4b comprises sending a status response to the intermediate network device 111. In another example, where action 4a comprises sending of an HTTP request, action 4b comprises sending an HTTP status response, e.g. HTTP status response 200, to the intermediate network device 111. In other examples, for example where action 4a comprises sending a UDP request to the data broker 114, the data broker 114 may not send a response to the intermediate network device 111.

In examples where the data broker 114 is configured to receive an ICAP request from the intermediate network device 111, the data broker 114 may comprise a segments cache, an ICAP router, and an ICAP server. In examples where the data broker 114 is configured to receive a HTTP or HTTPS request from the intermediate network device 111, the data broker 114 may comprise a segments cache, and an HTTP or HTTPS proxy server. In examples where the data broker 114 is configured to receive a UDP request from the intermediate network device 111, the data broker 114 may comprise a segments cache, a UDP proxy server and an HTTP proxy server.

At block 331b, the data broker 114 processes the request received from the intermediate network device 111. At block 331b the data broker 114 is thus in receipt of the subscriber identifier, as well as the second network request comprising the second network identifier. The data broker 114 is configured to use the subscriber identifier to obtain data originating in the service provider network 110 related to the subscriber identifier. At action 4c the data broker 114 submits a request for data relating to the subscriber identifier to a data storage 113 comprising data originating in the service provider network 110.

Data storage device 113 is accessible to data broker 114 from within the service provider network (but not accessible from one or more public networks) and stores subscriber profile data comprising one or more of information associated with the subscriber and information associated with one or more subscriber devices. In this case, the subscriber identifier (e.g. an international mobile subscriber identity number) may be mapped to a user equipment identifier (e.g. an international mobile station equipment identity). For example, the mapping may comprise a row in a look-up table or the equivalent pairing in an associative array. In this case, the one or more data indexes may then be used to identify a data record in the data originating from the service provider network. The data storage 113 may comprise a cache, random access memory or a persistent storage device such as a magnetic hard disk or solid state storage device.

In examples herein, subscriber data in the service provider network 110 may comprise any data that is accessible to the service provider network 110, e.g. data stored on data storage 113. For example, it may comprise one or more of: personal information associated with the subscriber, such as name, date of birth, home or postal address, email address, international mobile subscriber identity number or numbers, gender, employment details etc.; information associated with subscriber devices registered with the subscriber, such as make and model, equipment specifications and characteristics (e.g. storage capabilities, screen size, available memory and processor); network usage history such as telephone call logs, short messaging service logs, browser session logs (including URL and search histories for a subscriber) etc.; and geo-location data, such as records of base stations that have been used to access the service provider network and/or global positioning system data transmitted by user equipment as part of service provider network operation. The data originating from the service provider network may comprise one or more of raw data and processed data. For example, in the latter case, the data may comprise a result of one or more processing and/or analytic functions, such as a result of behaviour profiling based on subscriber data. The data originating from the service provider network may further comprise one or more user-generated preferences, such as a declared interest in one or more services offered by the server device 130.

At action 4d data requested by the data broker 114 is returned from the data storage 113, providing the data broker 114 with the requested subscriber data related to the subscriber identifier. Now returning to FIG. 3, at block 331, the data broker 114 thus becomes in possession of the second network identifier, the subscriber identifier, and subscriber data relating to that subscriber identifier.

According to some examples, block 331 further includes anonymising the subscriber data or a portion thereof, by the data broker 114. Anonymization may comprise processing the data originating from the service provider network such that a given data value may apply to at least a (predefined) plurality of subscribers in a subscriber profiled data storage. For example, a data value indicating gender of a subscriber may be considered an anonymised value as a large number of other subscribers will also share the same gender value. However, address data may not be considered anonymised. Therefore, an anonymization process may comprise selecting the first m postal code values of an address, e.g. identifying an anonymised region that may comprise many subscribers. If the data originating from the service provider network is to comprise several different data items associated with a given subscriber, then anonymization may comprise processing one or more of the data items such that the combined set of data items apply, at most, to X % of subscribers. For example, value ranges may be configured to anonymise data items, e.g. a date of birth may be shared by less than 1% of subscribers but an age range may be configured such that it is shared by at least 15% of subscribers, where "15%" is deemed to anonymise subscribers. In this case, the start and end of the range may be provided as data items by the data broker. In one case, anonymization may comprise replacing a subscriber or subscriber device identifiers with data values, e.g. demographic information and/or device parameters that are not useable to determine the identity of the subscriber and/or the subscriber device. Anonymised data items may be stored in a look-up table together with the network identifier. In other cases, anonymization may be performed by the data broker 114 before transmission to the server device 108. In both cases, anonymization may be performed before data is transmitted over public networks.

At action 3f, the service provider network 110, namely the data broker 114 in this example, provides at least a portion of the subscriber data obtained from the data storage 113 and the second network identifier to the server 140. In an example, the server 140 and data broker 114 are configured to communicate with one another via a secure communication channel, e.g. using HTTPS messages. The portion of subscriber data is then sent as an HTTPS message at action 3f and the second network identifier is included in said message. The server 140 thereby receives subscriber data and the second network identifier from the service provider network 110.

At block 341, server 140 has received, from the data broker 114, the subscriber data retrieved by the service provider network 110 (at block 331) and the second network identifier. The server 140 has also received the first network identifier from the second entity 130 and a request for subscriber data. The server 140 in this example is configured, at block 341 to process the request for data from the second entity 130 to determine whether it is permissible for subscriber data to be provided to the second entity 130. The server 140 is configured to perform a verification process using the first network identifier and the second network identifier to determine whether it is permissible for the subscriber data to be supplied to the second entity 130.

In one example, the verification process may comprise verifying that the first network identifier and the second network identifier originated from subscriber device 102. The server 140 may also verify that the network identifiers originated from the same pair of network requests (i.e. the first network request and the second network request) and thus relate to the same instructions executed at 310. As mentioned above, each network identifier may be provided as part of a network request, for example forming part of the header of an HTTP network request. The server device 140 may therefore be configured to parse a received network request for the presence of a network identifier. This may comprise determining whether a particular query parameter or header field is present in an HTTP request. In examples, the first network identifier and the second network identifier are copies of the same network identifier, as produced by the subscriber device 102. Therefore, in such examples, the server 140 may compare the first network identifier with the second network identifier to determine that they are identical. If they are determined to be identical, the server 140 may determine that it is permissible to supply subscriber data to the second entity 130.

In the example of FIG. 3, at block 341 the server 140 determines that it is permissible to supply subscriber data to the second entity 130. Therefore, at action 3g, the server 140 sends a network response to the second entity 130, wherein the network response comprises at least a portion of the subscriber data requested by the second entity 130. In an example, where the server 140 is unable to verify the first and second network identifiers, or, for example, determines that the network identifiers do not both originate from the subscriber device, or are not related to the same set of network requests from the subscriber device, the server 140 determines that it is not permissible to provide subscriber data to the second entity 130. The server 140 may then, instead of sending subscriber data, send an error message to the second entity 130.

In examples described above, the server 140 is configured to: receive the request for subscriber data and the first network identifier from the second entity 130, and receive the first network identifier and the subscriber data from the service provider network 110. As such, in the above described example, the server 140 is configured to perform the verification process using the network identifiers. However, in an alternative example, the server 140 is configured to receive the request for data and the first network identifier from the second platform, and in response, transmit the request for data and the first network identifier to the data broker 114. In this alternative example, the data broker 114 is therefore provided with the first network identifier from the server, and with the second network identifier from the subscriber device 102 via the intermediate device 111 (as in previous examples). The data broker 114 may then perform the verification process using the network identifiers to determine whether it is permissible to provide subscriber data to the second entity 130. In such an example, the data broker 114 may provide the subscriber data to the server 140 conditional upon this verification, or may, for example, provide the data to the server 140 and also provide a message to the server 140 indicating that it is permissible to supply the data to the second entity 130.

The above-described method therefore allows for an entity external to the service provider network 110, in the above examples the second entity 130, to be provided with subscriber data originating within the service provider network 110. As mentioned above, in examples, the subscriber data is anonymised by an entity within the service provider network 110, such as the data broker 114. As such, the second entity 130 is provided with anonymised subscriber data which it may use to determine a response to a network request originating from the subscriber device 102, without knowing the identity of the subscriber. The present method allows for above to be achieved even though the first network request and first network identifier are not accessible by the service provider network 110 due to being sent from the client device via a secure communications channel to the first entity 120.

Returning to FIG. 3, in steps subsequent to the second entity 130 receiving a response from the server 140 comprising subscriber data, the second entity 130 processes the response from the server 140 at block 342. In processing the response, the second entity 130 determines a browser response to send to the first entity 120. The response sent from the second entity 130 to the first entity 120 contains content which is dependent on the subscriber data received from the server 140. For example, the second entity 130 may use the obtained subscriber data to determine a price to bid on an advertisement request, and/or to determine characteristics of an advertisement to respond with. At action 3h, the second entity sends such a response to the first entity in response to the request made from the first entity to the second entity at action 3c.

The first entity 120 at block 343 processes the response from the second entity 130 and prepares a response to the network request sent from the subscriber device at action 3b. At action 3i, the first entity 120 sends a response to the subscriber device 102 comprising content which is dependent on the subscriber data provided from the server 140 to the second entity 130. The subscriber device 102 is thus provided with a browser response from the first entity 120, which may transmit the response into the telecommunications network 100, directed at the subscriber device 102. In example, the response comprises content which is based on the subscriber data provided to the second entity 130. In the example of FIG. 3, the response at action 3*i* is also routed through intermediate network device 111, which forwards the response 3*i* to the subscriber device 102. In other examples, the response need not be routed via intermediate network device 111 but may use a different routing path (e.g. default or normal path) within the service provider network 110.

While in examples described with reference to the figures, the method has been described operating in a network comprising a first entity and a second entity, it should be appreciated that in other example methods, subscriber data may be supplied from the server 140 to different entity. For example, in another example method, first entity 120 may be omitted and the subscriber device 102 may send the second network request to the second entity 130. In other examples, more than two entities may operate to process the second network request, i.e. there may be further intermediate entities between the first entity 120 and the second entity 130.

Figure 5:
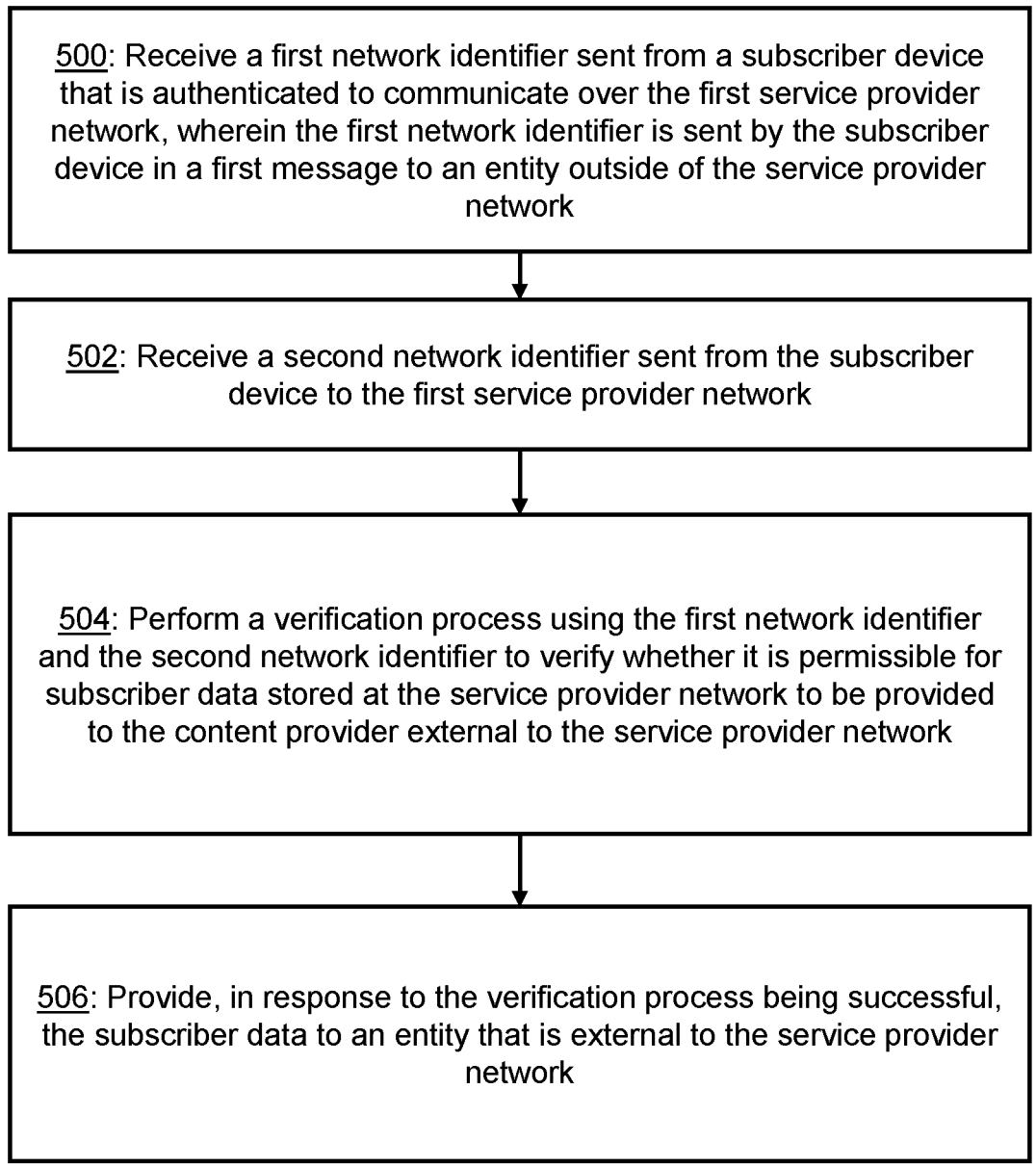
FIG. 5 and FIG. 6 are flow charts showing example methods according to the present disclosure.

FIG. 5 is a flow diagram that describes an example method of providing subscriber data stored at a first service provider network. The method comprises, at block 500, receiving a first network identifier sent from a subscriber device that is authenticated to communicate over the first service provider network, wherein the first network identifier is sent by the subscriber device in a first message to an entity outside of the service provider network. At block 502, the method comprises receiving a second network identifier sent from the subscriber device to the first service provider network. The method comprises at block 504, performing a verification process using the first network identifier and the second network identifier to verify whether it is permissible for the subscriber data stored at the service provider network to be provided to the content provider external to the service provider network. At block 506, the method comprises providing, in response to the verification process being successful, the subscriber data stored at the service provider network to an entity that is external to the service provider network. The method of FIG. 5 may in one example be performed by an entity such as server 140, or may in another example be performed by a plurality of entities such as the server 140 and the data broker 114.

Figure 6:
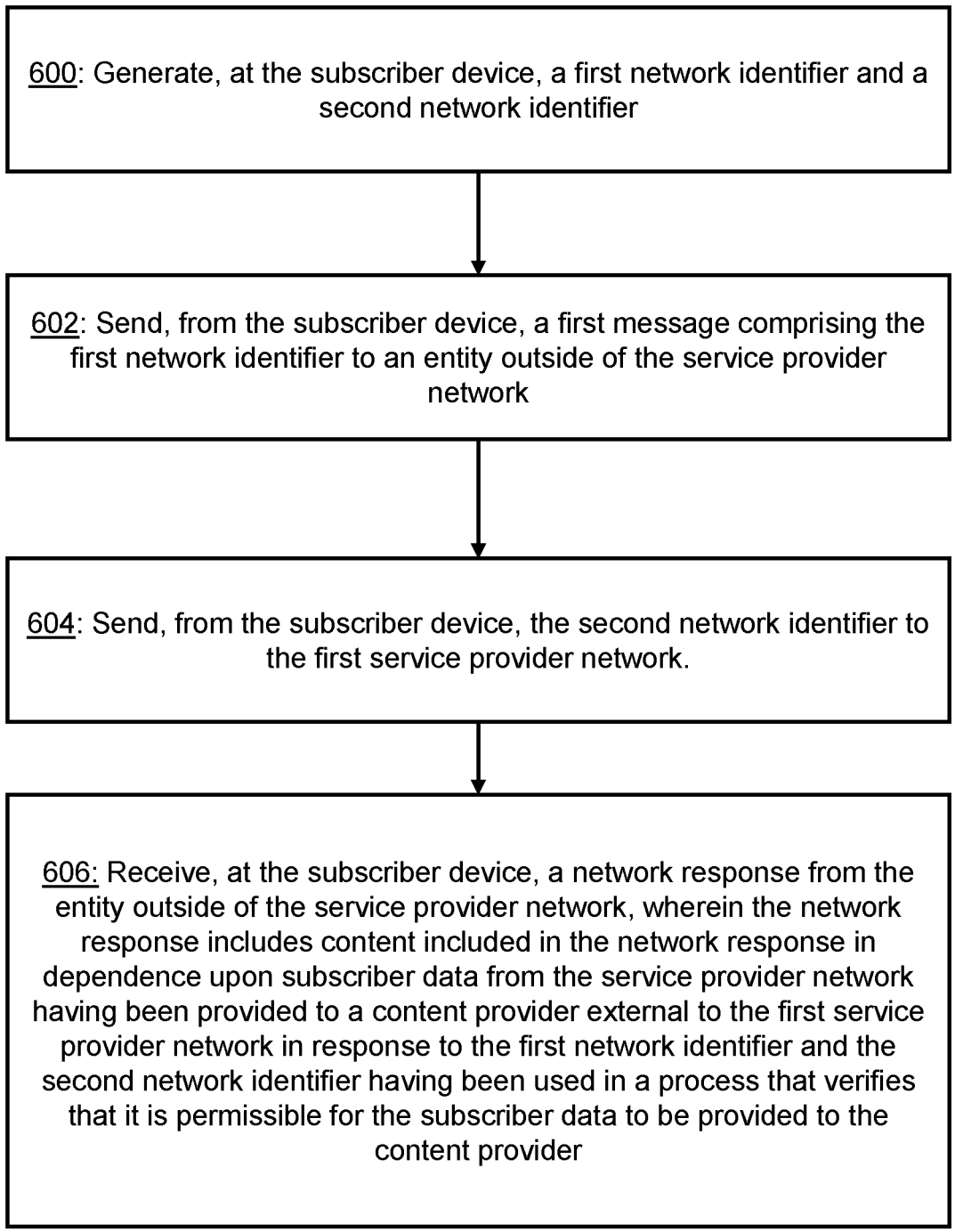

FIG. 6 is a flow diagram that describes an example method from the perspective of a subscriber device, such as subscriber device 102, that is authenticable to communicate over a first service provider network. At block 600, the method comprises, generating a first network identifier and a second network identifier. At block 602, the method comprises sending a first message comprising the first network identifier to an entity outside of the service provider network. At block 604, the method comprises sending the second network identifier to the first service provider network. At block 606, the method comprises receiving, at the subscriber device, a network response from the entity outside of the service provider network, wherein the network response includes content included in the network response in dependence upon subscriber data stored at the service provider network having been provided to a content provider external to the first service provider network in response to the first network identifier and the second network identifier having been used in a process that verifies that it is permissible for the subscriber data stored at the service provider network to be provided to the content provider.

Certain examples described herein may be considered to relate to the provision of subscriber data to a requesting entity as a service, as the data broker and server are configured to supply data originating from within the service provider network as a computing service to the requesting entity, e.g. requesting entity operates as a client for services provided by the server and the data broker, wherein the data broker operates as a server. In one example application of this functionality, the server may provide subscriber data to a requesting entity, which may be for example an advertising server requesting subscriber data in order to inform its response to an advertisement request.

The above examples are to be understood as illustrative examples of the invention. Further examples of the invention are envisaged. For example, whilst some of the above examples have been described in relation to packetized data traffic such as HTTPS data, it is to be understood that the methods and systems disclosed herein are also applicable to any similar or equivalent protocol, in particular any request/response based protocol. For example, requests described in examples herein as sent via HTTPS may be sent via HTTP.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method for providing subscriber data from a service provider network to a content provider external to the service provider network, the method comprising:
   receiving a first network identifier sent from a subscriber device that is authenticated to communicate over the service provider network, wherein the first network identifier is sent by the subscriber device in a first message to an entity outside of the service provider network;
   receiving a second network identifier sent from the subscriber device to the service provider network;
   performing a verification process using the first network identifier and the second network identifier to verify whether it is permissible for subscriber data stored at the service provider network to be provided to the content provider external to the service provider network; and
   providing, in response to the verification process being successful, the subscriber data to the content provider external to the service provider network.

2. The method according to claim 1, wherein the first network identifier is un-accessible, in the first message, by the service provider network.

3. The method according to claim 1, wherein the subscriber data is provided in response to a request, originating from the content provider, for subscriber data, wherein the request from the content provider is made due to the first message sent by the subscriber device.

4. The method according to claim 1, wherein the entity outside of the service provider network which receives the first message from the subscriber device is a first entity, and the method comprises:
   receiving, from the service provider network, the second network identifier at a further entity outside of the service provider network; and
   receiving the first network identifier at the further entity;
   wherein the verification process is performed by the further entity, and wherein the further entity provides the subscriber data to the content provider external to the service provider network in response to the verification process being successful.

5. The method according to claim 1, comprising:
receiving at the service provider network, the first network identifier; and
wherein the verification process is performed within the service provider network, and the service provider network, in response to the verification process being successful, provides the subscriber data stored at the service provider network to a further entity that is external to the service provider network and is configured to provide the subscriber data to the content provider external to the service provider network.

6. The method according to claim 1, wherein the subscriber data provided to the content provider external to the service provider network is anonymised.

7. The method according to claim 1, wherein each network identifier comprises a random fixed-length string that is inserted into an application protocol request.

8. The method according to claim 1, comprising:
determining, by service provider network, a subscriber identifier for the subscriber using network data that is accessible within the service provider network; and
using the subscriber identifier to retrieve the subscriber data from at least one data storage accessible to the service provider network.

9. The method according to claim 8, wherein the service provider network comprises a first entity within the service provider network and a second entity within the service provider network, wherein:
receiving, at the service provider network, the second network identifier, comprises receiving the second network identifier at the first entity within the service provider network, wherein the first entity within the service provider network determines the subscriber identifier; and wherein the method comprises:
sending from the first entity within the service provider network to the second entity within the service provider network the second network identifier and the subscriber identifier; and
retrieving, by the second entity within the service provider network, the subscriber data from the at least one data storage using the subscriber identifier.

10. The method according to claim 9 wherein the second network identifier and the subscriber identifier are sent from the first entity to the second entity in an internet content application protocol (ICAP) request, an HTTP request, an HTTPS request, or a user datagram protocol (UDP) request.

11. A method for receiving content at a subscriber device that is authenticable to communicate over a service provider network, the method comprising, at the subscriber device:
generating a first network identifier and a second network identifier;
sending a first message comprising the first network identifier to an entity outside of the service provider network;
sending the second network identifier to the service provider network;
receiving, at the subscriber device, a network response from the entity outside of the service provider network, wherein the network response includes content included in the network response in dependence upon subscriber data from the service provider network having been provided to a content provider external to the service provider network in response to the first network identifier and the second network identifier having been used in a process that verifies that it is permissible for the subscriber data to be provided to the content provider.

12. The method according to claim 11 wherein the first network identifier is un-accessible, in the first message, by the service provider network.

13. The method according to claim 11, wherein the first network identifier is sent to the entity outside of the service provider network via a secure communications channel between the subscriber device and the entity outside of the service provider network.

14. The method according to claim 11 wherein the second network identifier is sent via a secure communications channel between the subscriber device and the service provider network.

15. The method according to claim 11 wherein the second network identifier is sent in a second message comprising the second network identifier.

16. The method according to claim 15 wherein the second message is a synchronisation request to request synchronising of the processing of network requests by the service provider network.

17. The method according to claim 11 wherein the first message is a network request for an advertisement to be supplied via the entity outside of the service provider network.

18. The method according to claim 11 wherein the first message is an HTTPS network request.

19. The method according to claim 15 wherein the second message is an HTTPS network request.

20. A non-transitory computer readable medium comprising a set of machine-readable instructions which when executed by an apparatus cause the apparatus to perform a method for providing subscriber data from a service provider network to a content provider external to the service provider network, the method comprising:
receiving a first network identifier sent from a subscriber device that is authenticated to communicate over the service provider network, wherein the first network identifier is sent by the subscriber device in a first message to an entity outside of the service provider network;
receiving a second network identifier sent from the subscriber device to the service provider network;
performing a verification process using the first network identifier and the second network identifier to verify whether it is permissible for subscriber data stored at the service provider network to be provided to the content provider external to the service provider network; and
providing, in response to the verification process being successful, the subscriber data to the content provider external to the service provider network.

21. A non-transitory computer readable medium comprising a set of machine-readable instructions which when executed by a subscriber device cause the device to perform a method for receiving content at the subscriber device, the subscriber device being authenticable to communicate over a service provider network, the method comprising, at the subscriber device:
generating a first network identifier and a second network identifier;
sending a first message comprising the first network identifier to an entity outside of the service provider network;
sending the second network identifier to the service provider network;

receiving, at the subscriber device, a network response from the entity outside of the service provider network, wherein the network response includes content included in the network response in dependence upon subscriber data from the service provider network having been provided to a content provider external to the service provider network in response to the first network identifier and the second network identifier having been used in a process that verifies that it is permissible for the subscriber data to be provided to the content provider.

\* \* \* \* \*